US012784399B2

(12) United States Patent
Regina et al.

(10) Patent No.: US 12,784,399 B2
(45) Date of Patent: *Nov. 3, 2026

(54) DATA COLLECTION FOR OBJECT DETECTORS

(71) Applicant: Vade USA Inc., San Francisco, CA (US)

(72) Inventors: Mehdi Regina, Le Lamentin (FR); Maxime Marc Meyer, Avelin (FR); Sébastien Goutal, San Francisco, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 18/540,541

(22) Filed: Dec. 14, 2023

(65) Prior Publication Data

US 2024/0177448 A1 May 30, 2024

Related U.S. Application Data

(63) Continuation of application No. 17/339,632, filed on Jun. 4, 2021, now Pat. No. 11,893,769.

(51) Int. Cl.

| | |
|---|---|
| ***G06F 16/583*** | (2019.01) |
| ***G06F 16/58*** | (2019.01) |
| ***G06V 10/50*** | (2022.01) |
| ***G06V 10/54*** | (2022.01) |
| ***G06V 10/56*** | (2022.01) |

(52) U.S. Cl.

CPC .......... *G06V 10/56* (2022.01); *G06F 16/5838* (2019.01); *G06F 16/5854* (2019.01); *G06F 16/5862* (2019.01); *G06F 16/5866* (2019.01); *G06V 10/50* (2022.01); *G06V 10/54* (2022.01)

(58) Field of Classification Search

CPC ........ G06V 10/56; G06V 10/50; G06V 10/54; G06V 10/7788; G06V 10/95; G06F 16/5838; G06F 16/5854; G06F 16/5862; G06F 16/5866

See application file for complete search history.

(56) References Cited

U.S. PATENT DOCUMENTS 11,893,769 B2 * 2/2024 Regina ................ G06F 16/5866
2013/0273968 A1 * 10/2013 Rhoads .................. H04W 4/50 455/566

(Continued)

OTHER PUBLICATIONS

Lam et al, Simple Fusion of Object Detectors for Improved Performance and Faster Deployment, 2021, IEEE Access (9): 33235-33254. (Year: 2021).*

(Continued)

*Primary Examiner* — Kathleen M Broughton

(57) ABSTRACT

A computer-implemented method of generating metadata from an image may comprise sending the image to an object detection service, which generates detections metadata from the image. The image may also be sent to a visual features extractor, which extracts visual features metadata from the image. The generated detections metadata may then be sent to an uncertainty score calculator, which computes an uncertainty score from the detections metadata. The uncertainty score may be related to a level of uncertainty within the detections metadata. The image, the visual features metadata, the detections metadata and the uncertainty score may then be stored in a database accessible over a computer network.

36 Claims, 7 Drawing Sheets

(56) References Cited

U.S. PATENT DOCUMENTS

| | | | | |
|---|---|---|---|---|
| 2018/0293313 | A1* | 10/2018 | Hauptmann | G06F 16/7837 |
| 2019/0221002 | A1* | 7/2019 | Wang | G06T 7/73 |
| 2022/0051017 | A1* | 2/2022 | Choi | G06N 3/047 |
| 2022/0383019 | A1* | 12/2022 | Tremblay | G06V 40/11 |

OTHER PUBLICATIONS

Valentin et al, Weld Classification using Gray Level Co-Occurrence Matrix and Local Binary Patterns, 2018, IEEE International Conference on Imaging Systems and Techniques, pp. 1-7. (Year: 2018).*

Schubert et al, MetaDetect: Uncertainty Quantification and Prediction Quality Estimates for Object Detection, 2021, International Joint Conference on Neural Networks, pp. 1-11. (Year: 2021).*

Duan et al, CenterNet: Keypoint Triplets for Object Detection, 2019, arXiv: 1904.08189v3, pp. 1-10 (Year: 2019).*

Le et al., Uncertainty Estimation for Deep Neural Object Detectors in Safety-Critical Applications, 2018, 21st International Conference on Intelligent Transportation Systems, pp. 1-7. (Year: 2018).*

* cited by examiner

DATA COLLECTION FOR OBJECT DETECTORS

BACKGROUND

Embodiments relate to methods, devices and systems for generating metadata from collected images in the context of an object detection service. Collected data, i.e., images and associated metadata, enables automatized data selection, low-effort data annotation and extensive data analysis.

DETAILED DESCRIPTION

Figure 1:
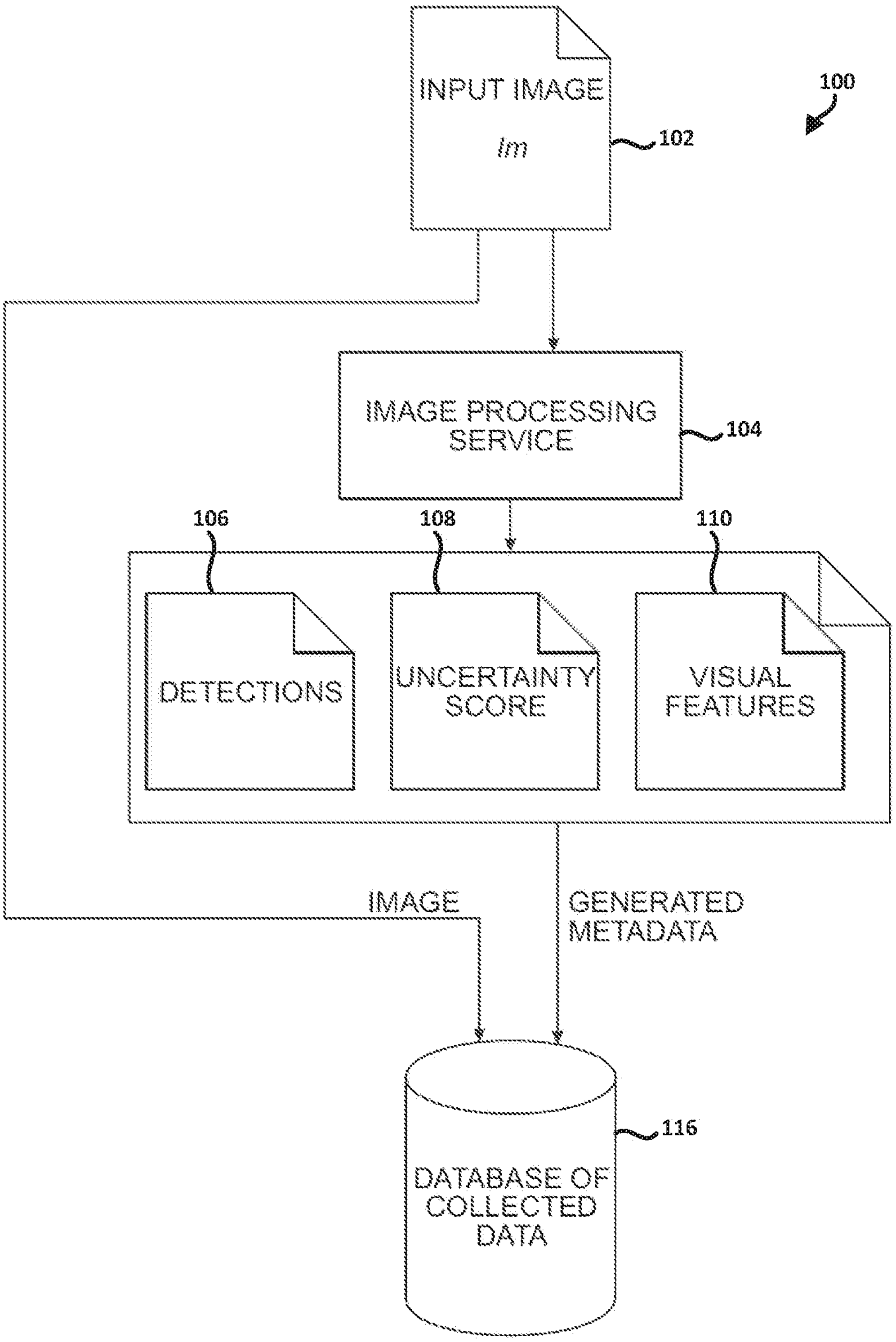
FIG. 1 is a flowchart of a computer-implemented method of data collection, considering an image Im, according to an embodiment.

Herein, object detection is a supervised machine learning task for which an estimator, given annotated images, learns to detect objects in new images such that each object detected in an image is associated with a triplet: an object class (the object type, for example), a confidence score (a float within the range of [0,1], for example), and the object's position in the image (the coordinates of the bounding box in the pixel's space, for example). However, the process of annotating images used to train an estimator is both time consuming and costly. Indeed, a human must supervise the annotation of each object detected in an image, where the annotation specifies the object class and location of the detected object. Moreover, object detection generally relies on deep learning models that often require a large amount of annotated data to learn, due to the high number of parameters. Object detectors may also be trained multiple times in the lifetime of an object detection service to improve performances or to adapt to new data. Thus it is paramount to minimize the time spent on data selection and annotation.

Embodiments include methods, devices and systems to generate different kinds of metadata on collected images. Such metadata may be related to the objects detected within images, the uncertainty of the object detectors regarding the detections, and the visual features of images. Collected images with associated metadata can be used, for example, with active learning for automated data selection or to provide guidance to a human agent during the annotation process.

Object detection in computer vision is both a classification and regression problem. That is, given an input image, the objective is to output detections; i.e., to predict locations of bounding boxes containing target objects and the object classes of the objects within the bounding boxes. Detections are based on constraints induced by the annotation strategy and the algorithm's loss function. In one embodiment, the detection's bounding box may be rectangular, may contain only one object and may be of a size that is similar to the size of the object it contains. The input and output of an object detection algorithm according to one embodiment are shown in Table 1 below.

TABLE 1

Definition of inputs and outputs of an object detection estimator

| Input: RGB image Im | Output: Set of detections |
|---|---|
| A tensor of shape width, height, depth:<br>width: number of pixels along image width, where width ≥ 2<br>height: number of pixels along image height, where height ≥ 2<br>depth: the number of channels. Generally, there are 3 channels, each corresponding to a color (Red, Green, Blue).<br><br>Each element of the tensor may be defined as $x_{ijz}$, which may be an integer ∈ [0, 255] being the intensity of the image at pixel location i (integer ∈ [1, width]), j (integer ∈ [1, height]), and z (integer ∈ [1,3]). | Set of detections: $\{D_1, D_2, \ldots, D_l\}$<br>Each detection with $D_i$ with i in the set {1, ... , l} is a tuple (cls, s, b) such that:<br>cls is the object class in the set of object classes CLS<br>s is the object class confidence score (a float ∈ [0,1])<br>b is the bounding box location in the pixel space, defined by its opposite corners<br>(e.g., $b = (x_1, x_2, y_1, y_2)$ a tuple of integers with:<br>$x_1 \in [1, width - 1]$;<br>$x_2 \in [2, width]$;<br>$y_1 \in [1, height - 1]$;<br>$y_2 \in [2, height]$;<br>A bounding box has the same location along each channel. |

According to an embodiment, the object detection task may rely on Convolution Neural Networks (CNNs) as they achieve state-of-the-art performances, such as the SSD version of the ResNet-50 and VGG-16 algorithms. For example, a CNN may be used to detect logos. Pixm includes in their product pipelines a CNN to detect logos and icons in order to flag suspicious websites or emails. Research in the field is also active and multiple methods based on CNNs have been proposed recently to improve performance on object detection.

Different estimators (e.g., SVM, CNN) may be combined to improve performance on a given task. Indeed, combining estimators allows to reduce generalization error. Empirically, it has been found that estimators ensembles tend to yield better results when there is a significant diversity among estimators, such as when estimators errors are not correlated. Different methods have proposed to combine models in the context of object detection. These methods leverage bounding boxes overlapping information between object detectors, and combine detections using machine learning, probability theories and object detectors' performance.

In supervised learning settings, a model learns (i.e., its parameters are optimized) from annotated instances minimizing a loss function. There are two main costs imputed to model training; namely, the cost of annotation and the cost of model optimization. Contrarily to model optimization, which relies on gradient-based methods and computational power, instances annotation often requires human intervention and is not automated.

Active learning is a subfield of machine learning, which seeks to minimize the number of instances that must be annotated to reach a target performance. An active learning system evolves in an environment made of a large set of unlabeled instances, a relatively smaller set of labeled instances, at least one machine learning model, and at least one oracle (e.g., a human annotator) able to annotate instances correctly. Leveraging information from its environment, an active learning system aims to select the best set of M unlabeled instances for annotation by the oracle(s) to improve the machine learning model(s) once retrained. The number M of instances to annotate is a parameter that is called the budget.

Different active learning methods have been developed in order to assess the information contained in each unlabeled instance and to choose the M most information-dense ones to improve models. Thus, some methods rely on the uncertainty of machine learning models, i.e., the more a model is uncertain about an instance, the more the instance is considered informative and is considered to be of potential benefit to the training of the model. These methods use model predictions on the unlabeled set, for instance leveraging disagreements among predictions from a group of models. Other methods will study the impact of each unlabeled instance on the optimization of the machine learning model(s), i.e., instances that have a greater impact on the optimization of the models are the most informative. Eventually some methods will instead pick instances that are the most representative of the unlabeled set.

Most of these methods suppose that the budget is equal to 1, meaning that machine learning models are retrained for each new annotated instance. However, with the outcomes of deep neural networks (such as the ones commonly used for object detection) containing millions of parameters, the cost of model training increases significantly and quickly becomes prohibitive. Consequently, new active learning methods adapted to deep learning have been developed. These methods consider a higher budget (e.g., a batch of 100 instances) and consequently envisage fewer model training iterations. To select unlabeled instances for annotation, these methods take in account how informative but also how diverse instances are. Diversity becomes critical when considering batches. Indeed, if all selected instances are informative but similar to each other, one instance could reduce the contribution of similar ones in the model training. Thus, when considering a batch of similar instances to annotate, there exist a smaller and diverse batch of instances that would lead to similar model improvements.

Active learning methods make the assumption that the effort of annotation is equivalent for each unlabeled instance. Thus, as described above, instances are selected based upon their respective contributions to the training of the models. In the context of object detection however, the number of objects to annotate and their locations vary for each image instance. Therefore, the annotation effort is different for each image.

Images may be selected based upon their anticipated contribution to model training, but also based on the annotation effort involved. For instance, there are "annotator-centered" methods outside of the scope of active learning for which images are picked based solely upon the estimated effort of annotation. Other methods focus the selection of images for annotation based on both the annotation effort and the contribution to model training. One method proposes an active learning framework where the "informativeness" of a candidate image regarding model training is weighted against an estimated effort of annotation.

Estimating the effort of annotation is a complex task whose added value in the annotation process is not guaranteed. Indeed, the variation of annotation effort depends on many factors related to the object detection task such as the diversity of object classes, sizes, locations, number per images, etc. The stronger the variation of annotation effort among images, the more the annotation process could benefit from the annotation effort estimation.

One embodiment collects images and generates metadata in the context of object detection. Collected data, i.e., images and associated metadata, may be used later for data selection, data annotation or data analysis. Three types of metadata may be output by an Image Processing Service for a given input image. These metadata may include, according to an embodiment:

- A metadata named Detections that contains n+2 detection sets (one set for each object detector, one combination set and one refined set) with $n \in \{2, 3, \ldots \infty\}$ being the number of object detectors in the Image Processing Service. Each detection set contains l detections as defined in Table 1 above, with $l \in \{0, 1, 2, \ldots \infty\}$.
- A metadata named Visual Features that contains at least one array describing visual information about the image, e.g., colors, shapes, textures, etc.
- A metadata named Uncertainty Score that contains one float that quantifies the uncertainty of object detectors regarding the image.

FIG. 1 is a flowchart of a computer-implemented method of data collection, considering an image Im, according to an embodiment. As shown therein, an input image Im 102 may be sent to both an image processing service 104 and to a database of collected data 116. According to one embodiment, the image processing service 104 may be configured to generate metadata from the image Im 102. The generated metadata may include, according to one embodiment, detections metadata 106, an uncertainty score metadata 108 and visual features metadata 110, which may be sent to and stored by the database of collected data 116, along with the input image Im 102.

The image processing service 104, according to an embodiment, may include

Figure 3:
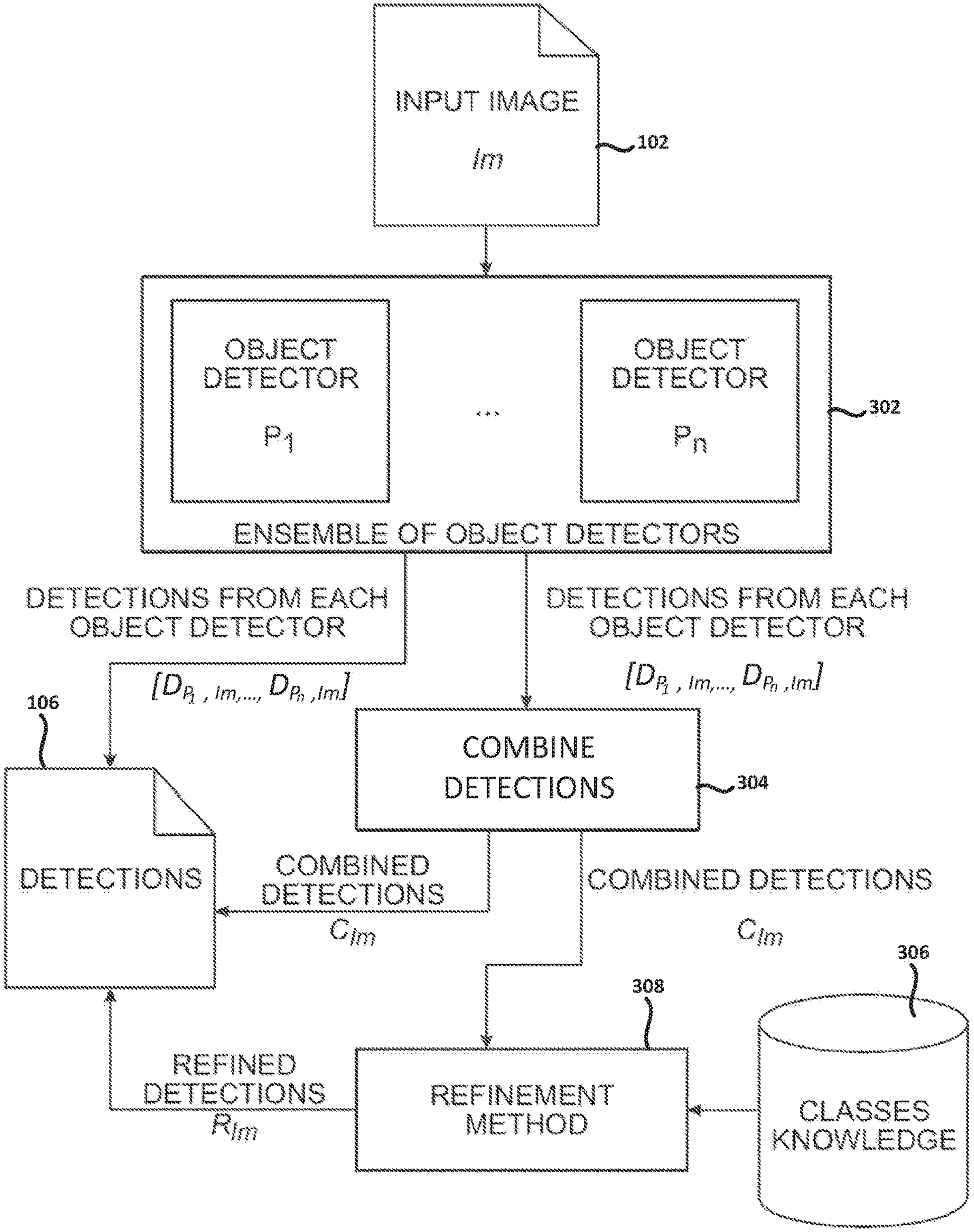
FIG. 3 is a flowchart showing aspects of an object detection service, according to an embodiment.
Figure 4:
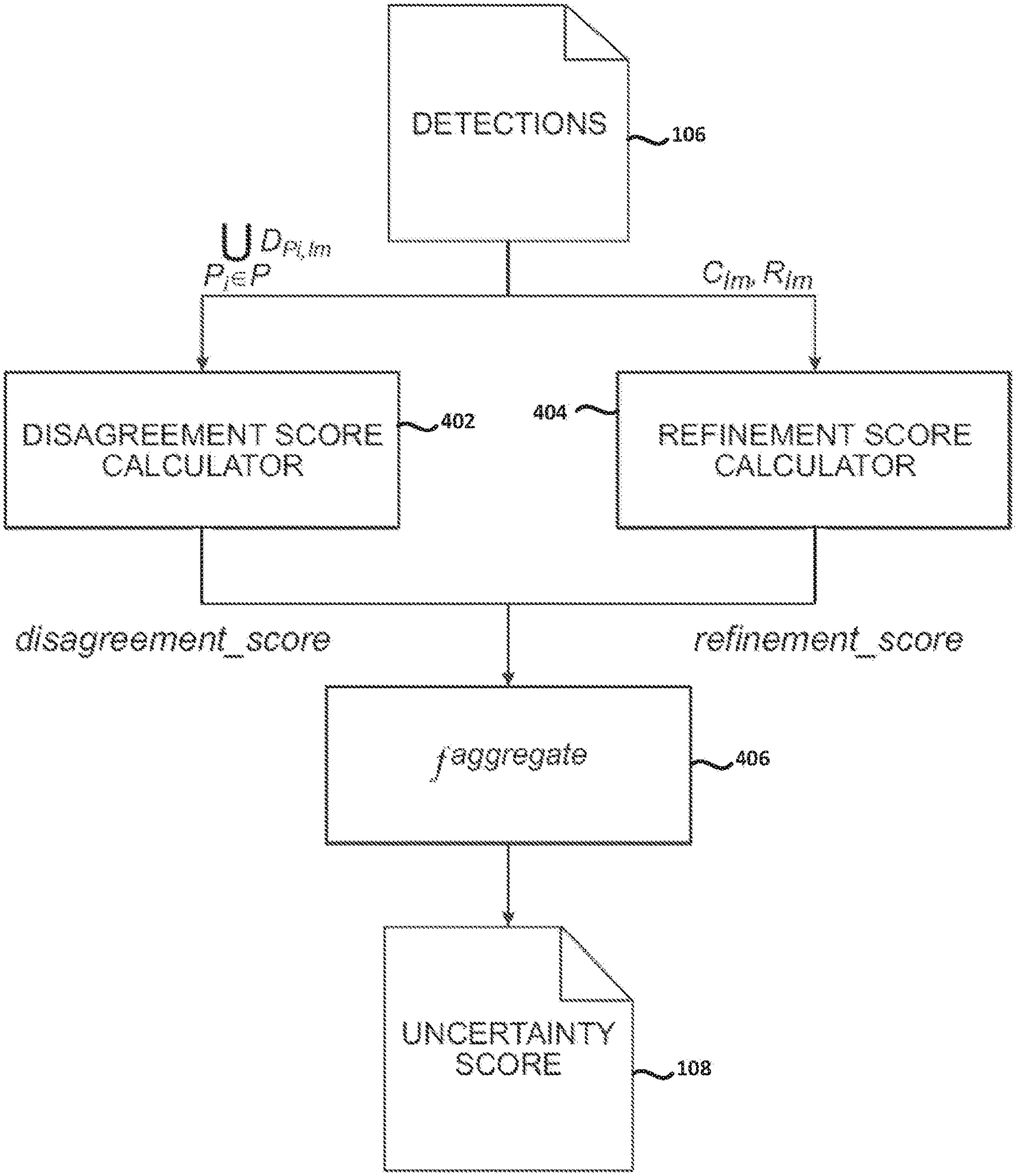
FIG. 4 is a flowchart showing aspects of an uncertainty score calculator, according to an embodiment.

- An object detection service (further detailed in FIG. 3);
- A visual features extractor, and
- An uncertainty score calculator (further detailed in FIG. 4).

Figure 2:
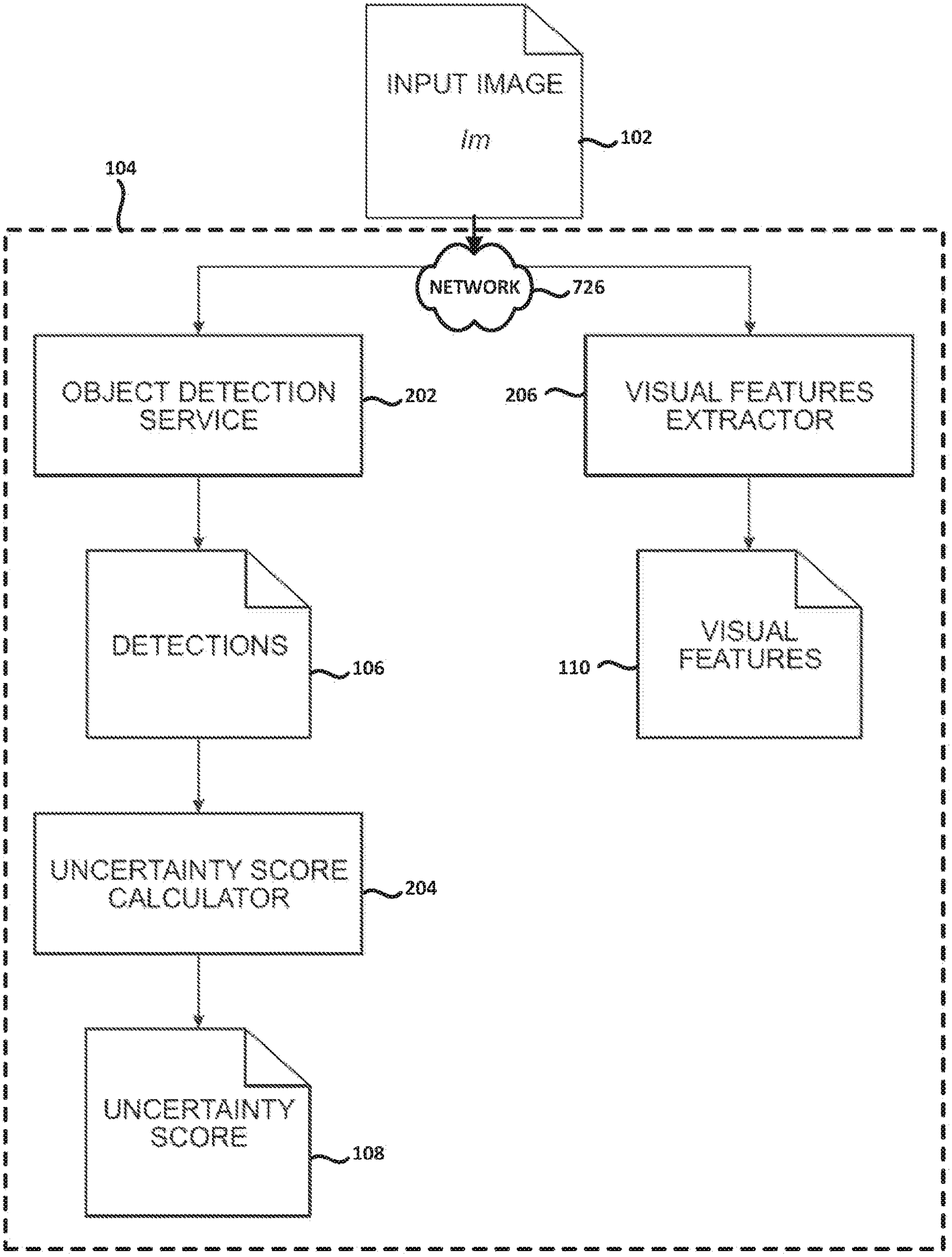
FIG. 2 is a flowchart showing aspects of an image processing service, according to an embodiment.

FIG. 2 shows additional details of the image processing service 104 of FIG. 1. As shown therein, input image Im 102 is sent, over a computer network 726, to the image processing service 104 which, according to one embodiment, may include an object detection service 202, an uncertainty score calculator 204, and a visual features extractor 206. According to one embodiment, the object detection service 202 receives the input image Im 102 and generates the detections metadata 106 therefrom. From the detections metadata 106, the uncertainty score calculator 204 generates the uncertainty score metadata 108. The input image Im 102 is also sent, over the computer network 726, to the visual features extractor 206, which generates the visual features metadata 110.

Visual Features Extractor: The visual features extractor 206, according to an embodiment, maps an input image tensor Im to at least one lower dimensional space that can be used to assess image similarity. For instance, the visual features extractor 206 may be configured to output one or several image descriptors such as histogram of oriented gradients (hereafter, "HOG") or colors histograms. The visual features extractor 206 may also be a Deep Learning model such as the encoding part of an auto-encoder outputting the projection of the image in a latent space. Thus, the visual features metadata 110 may contain at least one array (e.g., the HOG, the color histogram, or the image projection in a latent space, etc.) and enables the similarity or diversity of collected images to be assessed. Assessing the diversity of images may be useful when selecting images for the next training phase of object detectors, for instance leveraging active learning methods. Another exemplary application is the analysis of the input flow of images, for instance, grouping images in a feature space and visualizing the most representative images within a plurality of images.

Object Detection Service: The object detection service 202, according to an embodiment, includes n object detectors with n≥2, with one method configured to combine detections from each object detector and one method configured to refine detections based on pre-existing knowledge about detected object classes. Thus, in one embodiment, for a given input image, the object detection service 202 outputs n+2 detection sets, i.e., one detection set per object detector and two additional detection sets, one additional detection set that is related to the combination method and one additional detection set that is related to the refinement method. The object detection service 202 is detailed in FIG. 3 herein. Detected objects can be used as a guidance to facilitate the annotation of images and may also be used, for instance, to extract statistics about detected brands.

Uncertainty Score Calculator: The uncertainty score calculator 204, according to an embodiment, may be configured to output an uncertainty score metadata 108 based on the detections metadata 106 output by the object detection service 202. This uncertainty score metadata 108 aims to assess how uncertain the object detectors models are regarding the input image. The uncertainty score calculator 204 is detailed in FIG. 4 herein. This uncertainty score 108 may be used, for instance, in the process of data selection and active learning context.

Table 2 below sets out object detection service definitions.

TABLE 2

| object detection service definitions | |
|---|---|
| $P_i$ | An object detector trained on a given object detection task. An object detector processes images and outputs detections as defined in Table 1. |
| $P = \{P_1, \ldots, P_n\}$ | A set of n object detectors $P_i$ trained on the same object detection task, with n ≥ 2. |
| CLS | The set of object classes cls that are learned by the object detectors. Detection made by these object detectors have their object class included in this set. |

TABLE 2-continued

| object detection service definitions | |
|---|---|
| $D_k^{P_i,Im} = (cls_k^{P_i,Im}, S_k^{P_i,Im}, b_k^{P_i,Im})$ | A detection made by object detector $P_i$ for image Im as defined in Table 1. |
| $D_{P_i,Im} = \{D_1^{P_i,Im}, \ldots, D_l^{P_i,Im}\}$ | The set of l detections $D_k^{P_i,Im}$ made by object detector $P_i$ for image Im. It is important to note that l may be different for each image given an object detector and $l \in \{0,1,2, \ldots \infty\}$. Additionally, it is assumed that the set of detections from each object detector has been cleaned using common methods such as noise removal or non-max suppression, for example. |
| $C_{Im} = \{D_1^{Im}, \ldots, D_L^{Im}\}$ | The combined set of L detections for image Im. The combined set of detections is obtained combining all the sets of detections output by object detectors with a combination method. |
| $R_{Im} = \{D_1^{Im}, \ldots, D_{L'}^{Im}\}$ | The refined set of L' candidate detections for image Im. The refined set of detections is obtained by validating or invalidating detections from the combined set with a refinement method. |
| $rule_{cls,i}$ | Validation rule of index i for the object class cls of the set of object classes. Validation rules can be used to validate or invalidate detections based on pre-existing knowledge about object classes. |

FIG. 3 is a flowchart showing aspects of an object detection service, according to an embodiment. According to an embodiment, an image Im 102 may be passed to an ensemble of object detectors 302, which may include a service made of n object detectors $\{P_1, \ldots, P_n\}$. Each object detector $P_i$ outputs a set of detections $D_{P_i,Im}$. According to one embodiment, each of the output detections are cleaned. One example of such cleaning includes noise removal, carried out to discard detections whose confidence scores fall below a predetermined threshold. Other example of such cleaning includes non-max suppression, used to discard (e.g., redundant) detections from an object detector.

As shown at 304 in FIG. 3, the detections accuracy may be improved by combining the detections of the n object detectors $\{P_1, \ldots, P_n\}$ into a combined set of detections. This new set of combined detections, referred to as $C_{Im}$, may be generated, for example, using the combination method described in co-pending and commonly assigned U.S. patent application Ser. No. 16/712,713 filed on Dec. 12, 2019, which application is incorporated herein by reference in its entirety. Other methods to generate the combined set of detections may also be implemented within the scope of the present disclosure.

A database 306 may be provided and accessible (over a computer network, for example). Database 306 may be configured to store pre-existing knowledge about object classes in CLS to validate detections present in the combined detections $C_{Im}$. This object classes knowledge may be organized as a set of validation rules (e.g., one or more rules) for each object class.

According to one embodiment, a validation rule $rule_{cls,i}$ may relate to:

The dimension of a detection: the detected object of the object class cls is expected to have a certain shape or size.

The content of a detection: the detected object of the object class cls is expected to have certain characteristics, e.g., dominant colors, presence of characters, etc. For instance, in the context of logo detection, some object classes (i.e., logo brands) may be associated with one or more specific words.

Leveraging object classes knowledge, a refinement method 308 according to an embodiment may filter the set of detections from $C_{Im}$ and may create a new set $R_{Im}$. For instance, in the context of logo detection, the refinement method 308 may include Optical Character Recognition (hereafter, "OCR") to extract characters from a detection. The characters' extraction may then be compared to validation rules of the detected object class.

As noted above and as shown in FIG. 3, for a given input image, therefore, n+2 detection sets are stored in the detections 106, i.e., one detection set $D_{P_i,Im}$ per object detector and two additional detection sets, one additional detection set $C_{Im}$ that is related to the combination method 304 and one additional detection set $R_{Im}$ that is related to the refinement method 308.

Table 3 details uncertainty score calculation definitions

TABLE 3

| uncertainty score calculator definitions | |
|---|---|
| $f^{overlap}$ | The metric to measure the overlap between two detections. Two detections defined by their respective tuples $(cls_1, s_1, b_1)$ and $(cls_2, s_2, b_2)$ overlap if the area of the intersection of their bounding boxes $(b_1, b_2)$ is not null. The overlapping function takes as input two detections bounding boxes and outputs an overlapping score. The overlapping can be considered valid if the overlapping score is above a predetermined threshold. |
| disagreement_score | A value representing the level of disagreement amongst object detectors on an image. |
| refinement_score | A value representing the level of inconsistencies between detections and the pre-existing knowledge about object classes. |
| $f^{aggregate}$ | A function that takes as input an ensemble of values and returns a single value summarizing the ensemble. Possible aggregate functions include the average, the sum, the min, the max, for example. |
| uncertainty_score | A value representing the uncertainty of an ensemble of object detectors towards an image. This score is based on the disagreement_score and the refinement_score. |

FIG. 4 is a flowchart showing aspects of an uncertainty score calculator, according to an embodiment.

Disagreement Score Calculator

According to an embodiment, considering two object detectors $P_1$, $P_2$, for each detection $$D_i^{P_1,Im}$$

associated with object detector $P_1$, three cases are possible:

Same object detected: there exists a detection $$D_j^{P_2,Im}$$

made by the object detector $P_2$ that overlaps with $$D_i^{P_1,Im}$$

made by detector $P_1$, with the same detected object class, i.e., $$cls_i^{P_1} = cls_j^{P_2};$$

Different object detected: there exists a detection $$D_j^{P_2,Im}$$

made by the object detector $P_2$ that overlaps with $$D_i^{P_1,Im}$$

made by detector $P_1$, with a different detected object class, i.e.

$$cls_i^{P_1} \neq cls_j^{P_2};$$

or

No similar detection: there is no detection in $D_{P_2}^{,Im}$ made by the object detector $P_2$ that overlaps with $$D_i^{P_1,Im}$$

made by detector $P_1$.

Given an image Im, Different object detected and No similar detection cases characterize disagreement, as the object detectors are not able to make the same detections. Thus, considering the union of detections made by each object detector $\cup_{P_i \in P} D_{P_i,Im}$, the disagreement score calculator 402 shown in FIG. 4 can compute and output a disagreement_score.

According to an embodiment, detections in $\cup_{P_i \in P} D_{P_i,Im}$ can be grouped based on their overlap using $f^{overlap}$. Each group can then be labeled. The agreement group contains detections with same object class from each detector (i.e., Same object detected), and the disagreement group contains detections in which different objects were detected or in which no similar detections were made (i.e., Different object detected or No similar detection). If $\cup_{P_i \in P} D_{P_i,Im}$ is non empty, the disagreement_score can be calculated, for example, as a function of the number of agreement and disagreement groups. For instance, the disagreement score may be the ratio of disagreement groups to agreement groups. If $\cup_{P_i \in P} D_{P_i,Im}$ is empty, it may be concluded that all object detectors agree, i.e., there is no object to detect in the image, thus $disagreement_{score}=0$. Other disagreement metrics are possible.

Refinement Score Calculator

As shown in FIG. 4, the refinement score calculator 404, according to an embodiment, takes the detection set $C_{Im}$ that is related to the combination method 304 and the detection set $R_{Im}$ that is related to the refinement method 308 and returns a refinement_score. In one embodiment, the refinement method invalidates or validates a detection in $C_{Im}$ based on validation rules. An invalidated detection is uncertain, as its characteristics do not match pre-existing knowledge about the detected object class. Thus, an image that has many or a high proportion of invalidated detections may be related to a high object detectors uncertainty. Thus, a refinement score may be computed and output based on the combined set of detections and the refined set of detections contained in the detections metadata 106:

$$\text{refinement\_score} = f(C_{Im}, R_{Im})$$

For instance, the refinement score output from the refinement score calculator 404 may be the ratio of invalidated detections if the detection set $C_{Im}$ is not empty, i.e. Card $(C_{Im}) \neq 0$:

$$\text{refinement}_{score} = \frac{\text{Card}(C_{Im}) - \text{Card}(R_{Im})}{\text{Card}(C_{Im})}$$

Otherwise, if the detection set $C_{Im}$ is empty, i.e. Card $(C_{Im})=0$, it may be concluded that there is no refinement needed, thus $\text{refinement}_{score}=0$. Other refinement metrics are possible.

Uncertainty Score

The uncertainty score 108 shown in FIG. 4 may be computed by aggregating the refinement_score and disagreement_score:

$$\text{uncertainty\_score} = f^{aggregate}(\text{refinement\_score}, \text{disagreement\_score})$$

For instance, the uncertainty score 108 may be the average or the max of the refinement score and the disagreement score, among other possibilities This uncertainty score reflects the uncertainty in detections made for an image. As such, a high uncertainty score 108 reflects a disagreement between object detectors on an image and/or the fact that detections are expected to be incorrect based on pre-existing knowledge about object classes. The uncertainty score 108 is significant in identifying images that pose problems (high uncertainty score) to the ensemble of object detectors. This information can be used to select images, in the context of active learning, in order to update and improve object detectors.

Exemplary Use Case

In one implementation, an object detection service 202 has been developed based on Deep Learning models to detect brands logos on images—such as graphical renderings of branded emails and branded webpages. Among other applications, detecting brands and logos helps to characterize phishing attacks where attackers attempt to steal sensitive information using fraudulent webpages that impersonate legitimate brand webpages. As such, those fraudulent webpages mimic the legitimate ones, including one or more logos, trademarks, graphics, etc. of the impersonated brands that are present in the legitimate pages. However, the present methods and devices may find applicability well beyond the detection of phishing attacks, as those of skill may recognize.

Creating such models requires an important quantity of annotated data and the cost (including human time, financial, delay in generating trained models) of data annotation is significant. Moreover, as the phishing landscape is evolving constantly, these models should be updated on a regular basis. To reduce the cost of data selection and annotation during the update process, active learning techniques are employed, with the goal being to select the best data to improve the detection models while minimizing or at least controlling annotation-related costs.

In this use case, an agent wants to retrain object detectors and update the object detection service 202 with the help of a pool of one or several annotators. Note that the agent may be an annotator, and note also that the number of data to annotate is assumed to be greater than the number of annotators.

Figure 5:
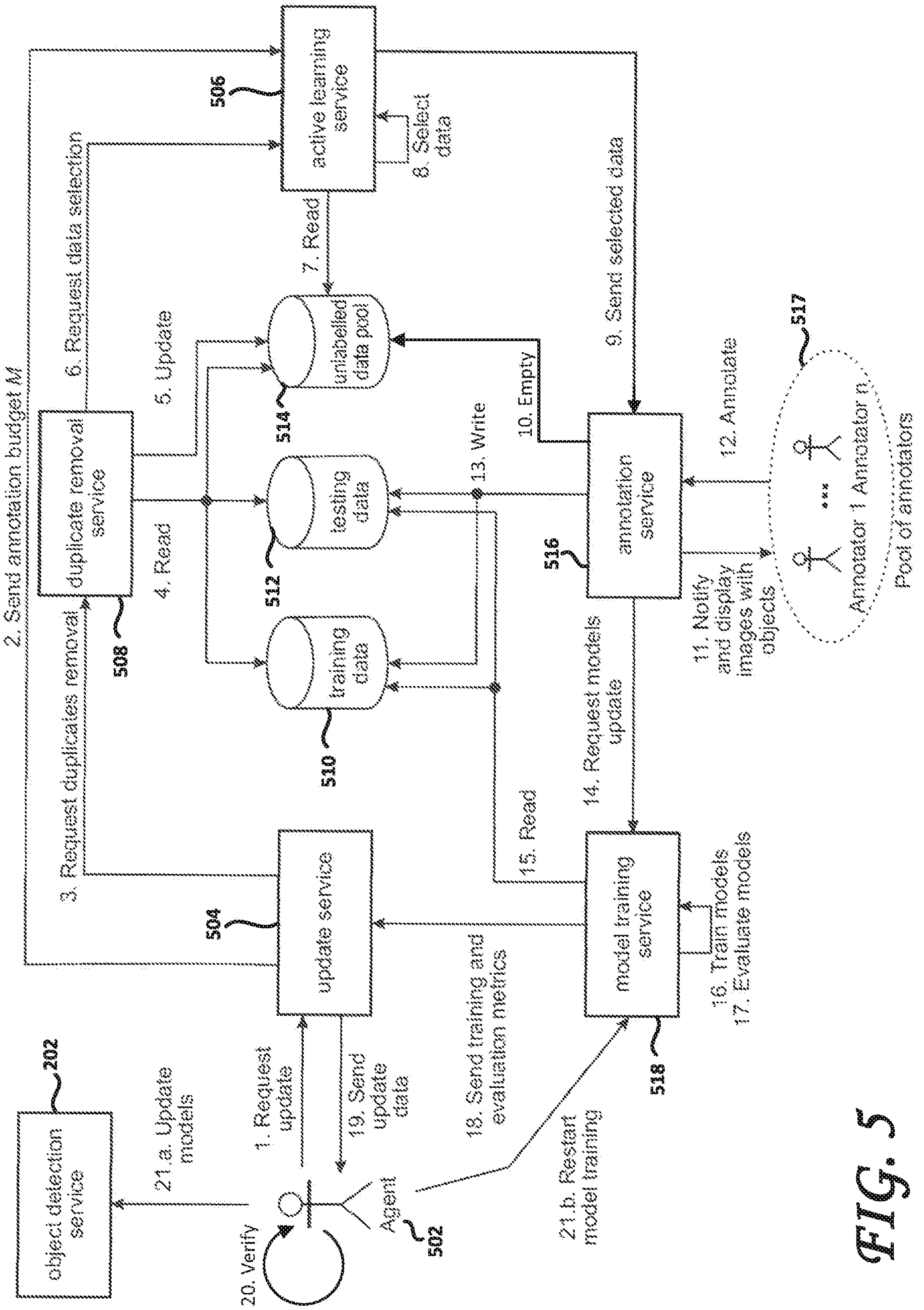
FIG. 5 is a flowchart showing aspects of an update of an object detection service using active learning with one agent and a pool of annotators, according to an embodiment.

As shown in FIG. 5 and according to one embodiment, the chronology of the events for this exemplary use case may proceed sequentially according to the numbering below—although variations are possible.

1. A request is made by, for example, an agent 502, to an update service 504, specifying an annotation budget M, which is the maximum number of images that will be annotated to update the object detection service 202.
2. The update service 504 sends the annotation budget M to an active learning service 506.
3. The update service 504 then sends a data update request to a duplicate removal service 508.
4. In this example, the duplicate removal service 508 fetches data from three different databases. A first database 510, called training_data, contains the images and annotations that were used to train the current version of the object detectors. A second database 512, called testing_data, contains the images and annotations that were used to evaluate the current version of the object detectors. Finally, a third database 514, called unlabeled_data_pool, contains the collected images and associated metadata—as described and shown herein—that were sent to the object detection service 202 since the last update.
5. The duplicate removal service 508 compare images from unlabeled_data_pool 514 to images from training_data 510 and testing_data 512 by comparing their respective cryptographic hash values. If an image from unlabeled_data_pool 514 is already present in one of the two other databases 510, 512 (i.e., if their respective cryptographic hash values are equal), then it is removed from unlabeled_data_pool 514, along with its metadata. Examples of cryptographic hash functions include MD5, SHA-1 and SHA-256, for example.
6. Once duplicates images are removed from unlabeled_data_pool 514, the duplicate removal service 508 notifies the active learning service 506 to perform data selection.
7. The active learning service 506 then computes a similarity matrix for the remaining, deduplicated images stored in the unlabeled_data_pool 514. Similarity values are obtained by comparing HOG and histograms of colors for each pair of images. HOG and color histograms may form part of the Visual Features metadata 110 for each image in unlabeled_data_pool 514 according to one embodiment.
8. The active learning service 506 selects images that are both diverse and uncertain, i.e., highly informative to the object detectors. To do so, the active learning service first clusters images from unlabeled_data_pool 514 into M groups $\{G_1, \ldots, G_M\}$, with M being the specified annotation budget. Clustering may be carried out by applying a clustering algorithm on the previously-computed similarity matrix. Then, the active learning service 506 selects at most one image per group $G_i$. Clustering and picking at most one image per group allow the selection of diverse images. According to one embodiment, the probability of picking an image Im in a given group is an increasing function of its uncertainty score present in the image metadata. Picking images based on the uncertainty score allows the prioritization of uncertain images in the selection process. Thus, the probability of picking an image $Im_\alpha$ in a given group $G_i$ is the normalized Uncertainty Score 108 in the group, with $$Prob_{Im_\alpha \in G_i} = \frac{\text{uncertainty\_score}_{Im_\alpha}}{\sum_{\forall Im_j \in G_i} \text{uncertainty\_score}_{Im_j}}.$$

Additionally, the probability of picking an image $Im_\alpha$ in a given group $G_i$ is set to 0 if its uncertainty score is below a minimum uncertainty threshold, $\text{uncertainty\_score}_{min}$. Consequently, at most one image per group is selected. For instance, if all images in a given group $G_i$ are highly certain (i.e., $\forall Im_j \in G_j$, $\text{uncertainty\_score}_{Im_j} < \text{uncertainty\_score}_{min}$), no image is picked.

9. The active learning service 506 sends the selected images and the associated Detections metadata to an annotation service 516.
10. Upon the reception of selected data, the annotation service 516 deletes all data stored in unlabeled_data_pool 514.
11. The annotation service 516 notifies a pool of one or several annotators 517. For each image, the annotation service displays detected objects based on the Detections metadata 106 to a given annotator. The displayed objects are based on the refined set of detections $R_{Im}$ by default.
12. Each annotator reviews one or several images, validating or invalidating displayed detections and adding new annotations when necessary.
13. Once the annotation of all selected images is completed, the annotation service 516 adds all images with annotated objects to the training_data 510. Annotated images that do not contain any object, i.e., empty annotation, can be added to the testing_data 512.
14. Additionally, the annotation service 516 requests an update of object detectors to a model training service 518.
15. The model training service 518 fetches the updated training_data 510 and testing_data 512.
16. The model training service 518 retrains the object detectors using the updated training_data 510.
17. The model training service 518 evaluates the performance of retrained object detectors on the testing_data 512.
18. Finally, the model training service 518 sends training and evaluation metrics to the update service 504.
19. Upon reception, the update service 504 notifies the agent 502 that object detectors have been trained and evaluated, the object detection service 202 is ready to be updated with the newly trained models.
20. The agent verifies training and evaluation metrics.
21. Finally, if satisfied by the metrics (case a), the agent 502 puts the new object detectors in production, replacing their counterpart in the object detection service 202, otherwise (case b), steps 15 to 20 are repeated.

Figure 6:
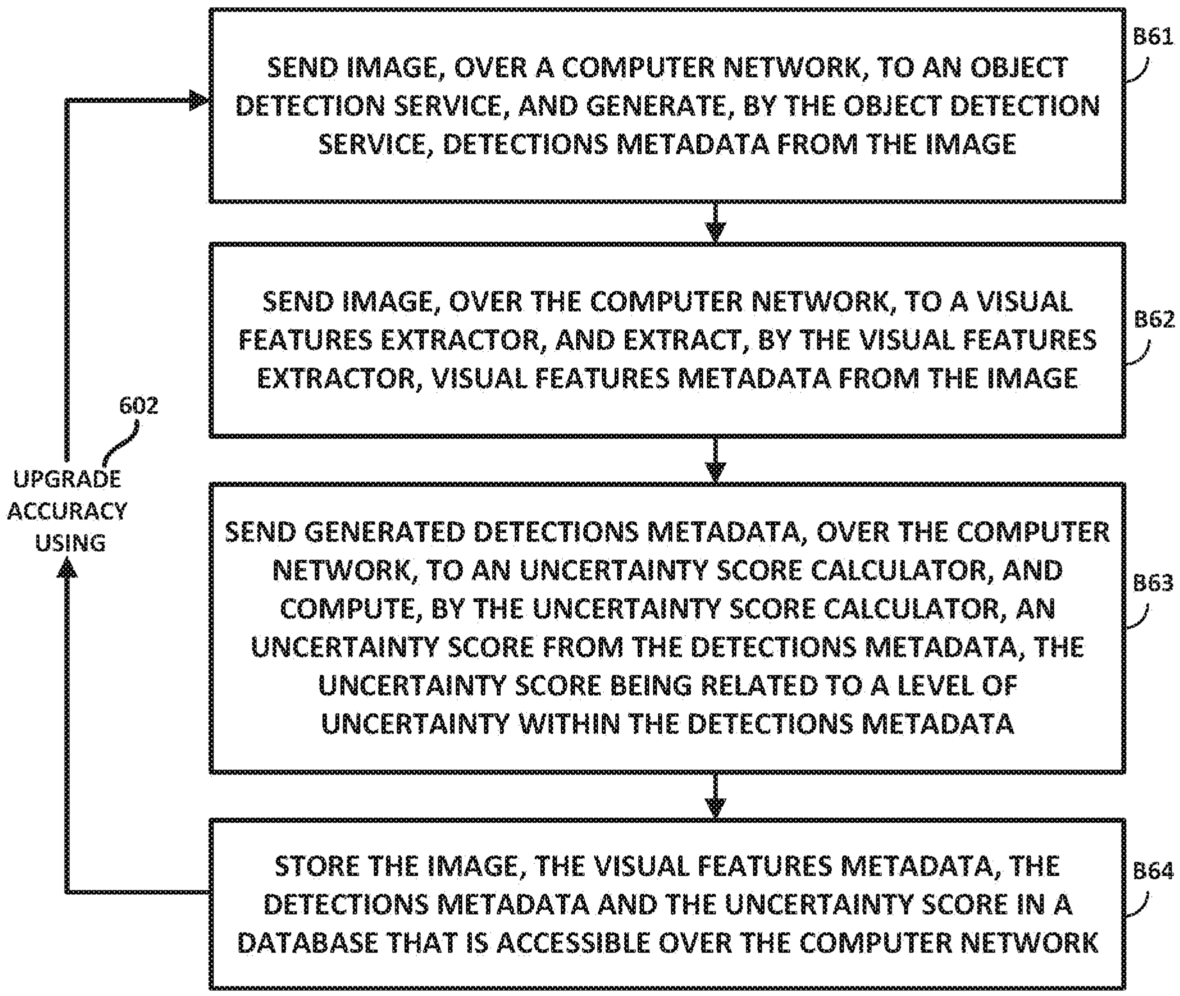
FIG. 6 is a flowchart showing aspects of a computer-implemented method of generating metadata from an image according to an embodiment.

FIG. 6 is a flowchart of a computer-implemented method of generating metadata from an image, according to one embodiment. As shown therein, block B61 calls for sending the image, over a computer network, to an object detection service. In one embodiment, the object detection service may detect l objects in the image for a set of at least two object classes, with l≥0. Detections metadata may then be generated by the object detection service. Block B62 of FIG. 6 calls for sending the image, over the computer network, to a visual features extractor, and extracting, by the visual features extractor, visual features metadata from the image. The generated detections metadata may then be sent, as shown at B63, over the computer network, to an uncertainty score calculator. The uncertainty calculator may then compute an uncertainty score from the detections metadata. The uncertainty score may be related to a level of uncertainty within the detections metadata. Finally, block B64 calls for storing the image, the visual features metadata, the detections metadata and the uncertainty score in a database that is accessible over the computer network.

According to further embodiments, the object detection service may comprise at least two object detectors, each of which being configured to detect objects within the image for a set of object classes and to output a set of detections. The method may also comprise the object detection service combining the set of detections output by each of the at least two object detectors to generate a combined set of detections. In one embodiment, the object detection service may validate or discard each detection from the combined set of detections based on pre-existing knowledge of the set of object classes to generate a refined set of detections. The pre-existing knowledge may comprise one or more validation rules for each object class of the set of object classes. Each validation rule may comprise information regarding dimensions or content of a bounding box of any detection of one object class.

The generated detections metadata may comprise a set of detections from each of the two or more object detectors, a combined set of detections that comprises a combination of the detections sets output by the at least two object detectors, and a refined set of detections that is based on pre-existing knowledge of the set of object classes. The visual features metadata extracted from the image may relate to colors in the image, shapes in the image and/or textures in the image. The visual features metadata extracted from the image may comprise, according to one embodiment, a histogram of oriented gradients (HOG) and/or a color histogram, for example. In one embodiment, the computer-implemented method may further comprise the uncertainty score calculator computing a disagreement score that is related to a level of disagreement between the at least two object detectors of the object detection service. Each detection of the sets of detections output by each object detector of the object detection service may be grouped into an agreement group or a disagreement group based on at least one object class of the set of object classes and the degree to which bounding boxes of the detections overlap. The method may also comprise labelling a group of overlapping detections as an agreement group when each object detector of the object detection service detects an object and all detections belong to a same object class. Conversely, the computer-implemented method may further comprise labelling a group of overlapping detections as a disagreement group when fewer than all object detectors have a detection in the group, and/or fewer than all detections belong to a same object class. The generated disagreement score may be related to the ratio of disagreement groups to agreement groups.

In one embodiment, the method may further comprise the uncertainty score calculator computing a refinement score that is related to the level of inconsistency between detections from the combined set of detections and pre-existing knowledge of the set of object classes. The refinement score may be related to the ratio of discarded detections obtained by comparing the combined set of detections to the refined set of detections. In one embodiment, generating the uncertainty score may comprise the uncertainty score calculator aggregating the disagreement score and the refinement score. In an embodiment, generating the uncertainty score may comprise the uncertainty score calculator calculating a maximum, minimum or an average of the disagreement score and the refinement score. In one embodiment, the stored image, visual features metadata, detections metadata and the uncertainty score may be used to upgrade the object detection service based upon contents of the database.

This is suggested at 602 in FIG. 6, in which the accuracy of the object detection service referred to in block B61 may be upgraded based at least partially upon contents of the database referred to in block B64.

Physical Hardware

Figure 7:
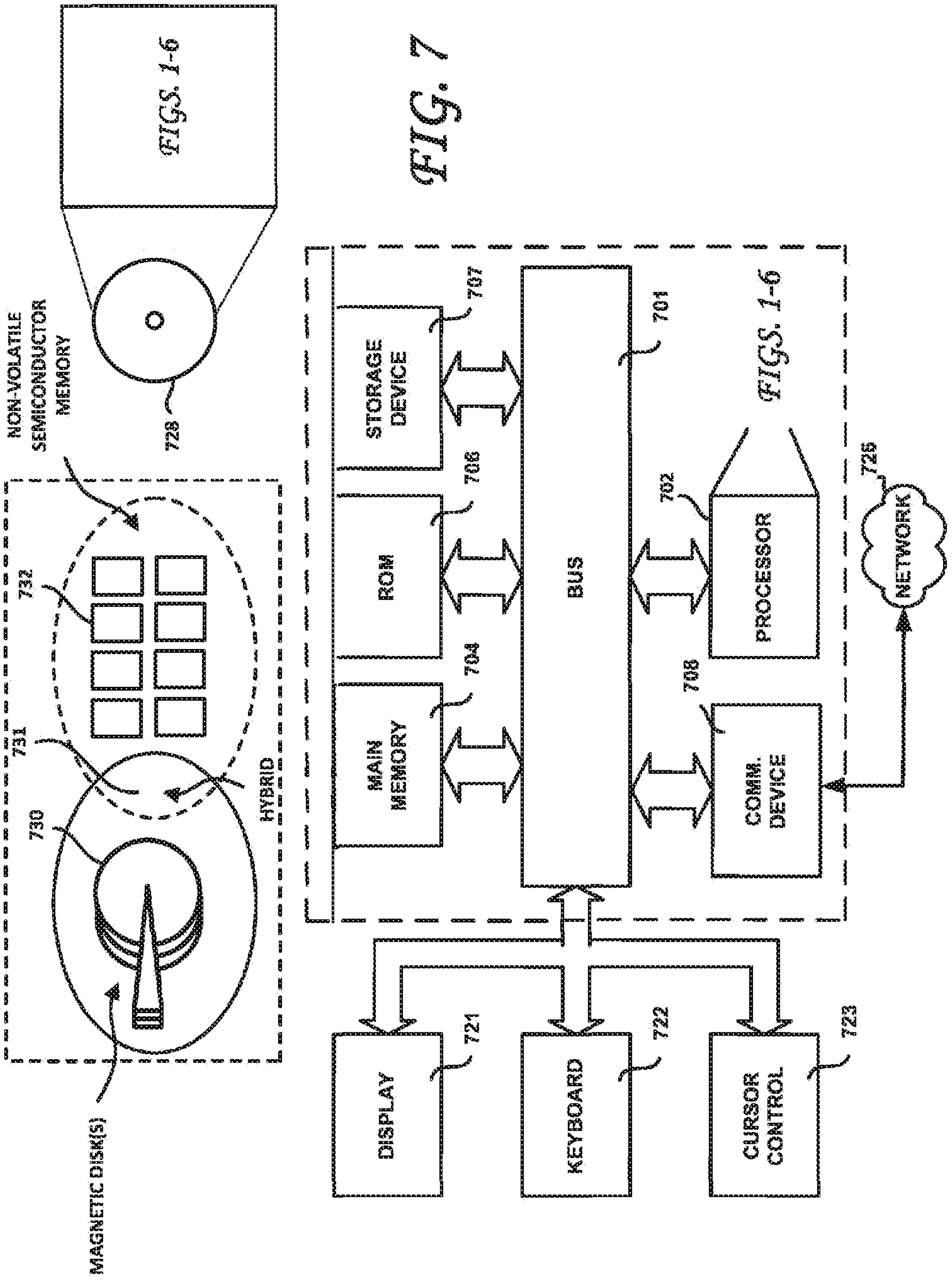
FIG. 7 is a block diagram of a computing device suitable for carrying out a computer-implemented method according to an embodiment and a computing device configured according to an embodiment.

FIG. 7 illustrates a block diagram of a computing device with which embodiments may be implemented. The computing device of FIG. 7 may include a bus 701 or other communication mechanism for communicating information, and one or more processors 702 coupled with bus 701 for processing information. The computing device may further comprise a random-access memory (RAM) or other dynamic storage device 704 (referred to as main memory), coupled to bus 701 for storing information and instructions to be executed by processor(s) 702. Main memory (tangible and non-transitory, which terms, herein, exclude signals per se and waveforms) 704 also may be used for storing temporary variables or other intermediate information during execution of instructions by processor 702. The computing device of FIG. 7 may also include a read only memory (ROM) and/or other static storage device 706 coupled to bus 701 for storing static information and instructions for processor(s) 702. A data storage device 707, such as a magnetic disk and/or solid-state data storage device may be coupled to bus 701 for storing information and instructions—such as would be required to carry out the functionality shown and disclosed relative to FIGS. 1-6. The computing device may also be coupled via the bus 701 to a display device 721 for displaying information to a computer user. An alphanumeric input device 722, including alphanumeric and other keys, may be coupled to bus 701 for communicating information and command selections to processor(s) 702. Another type of user input device is cursor control 723, such as a mouse, a trackball, or cursor direction keys for communicating direction information and command selections to processor(s) 702 and for controlling cursor movement on display 721. The computing device of FIG. 7 may be coupled, via a communication interface (e.g., modem, network interface card or NIC) 708 to the network 726.

As shown, the storage device 707 may include direct access data storage devices such as magnetic disks 730, non-volatile semiconductor memories (EEPROM, Flash, etc.) 732, a hybrid data storage device comprising both magnetic disks and non-volatile semiconductor memories, as suggested at 731. References 704, 706 and 707 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over the network 726. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 728. For example, reference 728 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 728 may be embodied as an encrypted solid-state drive. Other implementations are possible.

Embodiments of the present invention are related to the use of computing devices for collecting and generating (meta)data for object detectors, as shown and described herein. According to one embodiment, the methods, devices and systems described herein may be provided by one or more computing devices in response to processor(s) 702 executing sequences of instructions, embodying aspects of the computer-implemented methods shown and described herein, contained in memory 704. Such instructions may be read into memory 704 from another computer-readable medium, such as data storage device 707 or another (optical, magnetic, etc.) data carrier, such as shown at 728. Execution of the sequences of instructions contained in memory 704 causes processor(s) 702 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

One embodiment is a computing device that may comprise at least one processor; at least one data storage device coupled to the at least one processor; a network interface coupled to the at least one processor and to a computer network and a plurality of processes spawned by the at least one processor to generate metadata from an image or images. The processes may include processing logic for:

sending the image, over a computer network, to an object detection service, and generating, by the object detection service, detections metadata from the image;

sending the image, over the computer network, to a visual features extractor, and extracting, by the visual features extractor, visual features metadata from the image;

sending the generated detections metadata, over the computer network, to an uncertainty score calculator, and computing, by the uncertainty score calculator, an uncertainty score from the detections metadata, the uncertainty score being related to a level of uncertainty within the detections metadata, and storing the image, the visual features metadata, the detections metadata and the uncertainty score in a database that is accessible over the computer network.

According to embodiments, the object detection service may comprise two or more object detectors, each of which may be configured to detect objects within the image for a set of object classes and to output a set of detections for each of the object detectors. Processing logic may be provided for the object detection service to combine each set of detections output by each of the object detectors in the generated detections metadata to generate a combined set of detections. Furthermore, further processing logic may be provided for the object detection service to generate a refined set of detections, by validating or discarding each detection from the combined set of detections based on pre-existing knowledge of the set of object classes to generate a refined set of detections. The pre-existing knowledge may comprise one or more validation rules for each object class of the set of object classes. Each validation rule may comprise information regarding dimensions or content of a bounding box of any detection of one object class. The generated detections metadata may comprise a set of detections from each of the object detectors, a combined set of detections that comprises a combination of the detections sets output by the object detectors, and a refined set of detections that is based on pre-existing knowledge of the set of object classes.

The visual features metadata extracted from the image may be related, according to embodiments, to colors in the image, shapes in the image and/or textures in the image. The visual features metadata extracted from the image may comprise a histogram of oriented gradients (HOG) and/or a color histogram.

Processing logic may be configured for computing a disagreement score that is related to a level of disagreement (if any) between the object detectors of the object detection service. Processing logic may be provided for grouping each detection of the sets of detections output by each object detector of the object detection service into an agreement group or a disagreement group based on the object class of the set of object classes and/or the degree to which bounding boxes of the detections overlap. Processing logic may be provided for labelling a group of overlapping detections as an agreement group when each object detector of the object detection service detects an object and all detections belong to a same object class or as a disagreement group when fewer than all object detectors detect an object, and/or fewer than all detections belong to a same object class.

In one embodiment, the generated disagreement score may be related to a ratio of disagreement groups to agreement groups. Processing logic may be provided for the uncertainty score calculator to compute a refinement score that is related to a level of inconsistency between detections from the combined set of detections and pre-existing knowledge of the set of object classes. The refinement score may be related to a ratio of discarded detections obtained by comparing the combined set of detections to the refined set of detections. The processing logic for generating the uncertainty score may comprise processing logic for the uncertainty score calculator to aggregate the disagreement score and the refinement score. Processing logic may also be provided for the uncertainty score calculator to calculate a maximum, a minimum and/or an average of the disagreement score and the refinement score. Processing logic may be provided for using the stored image, visual features metadata and uncertainty score in the database to upgrade the object detection service based upon contents of the database.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of computers by enabling the upgrades to the functioning of object detectors by providing updated training data. Such computer-implemented methods are not capable of being effectively carried out by the mental processes of humans.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of generating metadata from an image, comprising:

sending the image, over a computer network, to an object detection service, and receiving, from the object detection service, detections metadata generated from the image;

wherein the object detection service comprises at least two object detectors, each of the at least two object detectors being configured to detect objects within the image for a same set of object classes and to output a set of detections;

sending the generated detections metadata, over the computer network, to an uncertainty score calculator, and receiving, from the uncertainty score calculator, an uncertainty score computed from the detections metadata, the uncertainty score being related to a level of uncertainty within the detections metadata, and storing the image, the detections metadata and the uncertainty score in a database that is accessible over the computer network.

2. The computer-implemented method of claim 1, further comprising the object detection service combining the set of detections output by each of the at least two object detectors to generate a combined set of detections.

3. The computer-implemented method of claim 2, further comprising the object detection service validating or discarding each detection from the combined set of detections based on pre-existing knowledge of the set of object classes to generate a refined set of detections.

4. The computer-implemented method of claim 3, wherein the pre-existing knowledge comprises at least one validation rule for each object class of the set of object classes.

5. The computer-implemented method of claim 4, wherein each validation rule comprises information regarding one of dimensions and content of a bounding box of any detection of one object class.

6. The computer-implemented method of claim 3, further comprising the uncertainty score calculator computing a refinement score that is related to a level of inconsistency between detections from the combined set of detections and pre-existing knowledge of the set of object classes.

7. The computer-implemented method of claim 6, wherein the refinement score is related to a ratio of discarded detections obtained by comparing the combined set of detections to the refined set of detections.

8. The computer-implemented method of claim 6, wherein generating the uncertainty score comprises the uncertainty score calculator computing a disagreement score that is related to a level of disagreement between the at least two object detectors of the object detection service and aggregating the disagreement score and the refinement score.

9. The computer-implemented method of claim 6, wherein generating the uncertainty score comprises the uncertainty score calculator computing a disagreement score that is related to a level of disagreement between the at least two object detectors of the object detection service and calculating one of a maximum, minimum and average of the disagreement score and the refinement score.

10. The computer-implemented method of claim 1, wherein the generated detections metadata comprises a set of detections from each of the at least two object detectors, a combined set of detections that comprises a combination of the detections sets output by the at least two object detectors, and a refined set of detections that is based on pre-existing knowledge of the set of object classes.

11. The computer-implemented method of claim 1, wherein visual features metadata extracted from the image relates to at least one of colors in the image, shapes in the image and textures in the image.

12. The computer-implemented method of claim 1, wherein visual features metadata extracted from the image comprises at least one of a color histogram, a histogram of oriented gradients (HOG) and a histogram of co-occurring grayscale values for a given offset.

13. The computer-implemented method of claim 1, further comprising the uncertainty score calculator computing a disagreement score that is related to a level of disagreement between the at least two object detectors of the object detection service.

14. The computer-implemented method of claim 13, further comprising grouping each detection of the sets of detections output by each object detector of the object detection service into one of an agreement group and a disagreement group based on at least one object class of the set of object classes and a degree to which bounding boxes of the detections overlap.

15. The computer-implemented method of claim 14, further comprising labelling a group of overlapping detections as an agreement group when each object detector of the object detection service detects an object and all detections belong to a same object class.

16. The computer-implemented method of claim 14, further comprising labelling a group of overlapping detections as a disagreement group when at least one of:

fewer than all object detectors have a detection in the group, and fewer than all detections belong to a same object class.

17. The computer-implemented method of claim 14, wherein the generated disagreement score is related to a ratio of disagreement groups to agreement groups.

18. The computer-implemented method of claim 1, further comprising using the stored image, detections metadata and uncertainty score in the database and visual features metadata extracted from the image to upgrade the object detection service based upon contents of the database.

19. A computing device comprising:

at least one processor;

at least one data storage device coupled to the at least one processor;

a network interface coupled to the at least one processor and to a computer network;

a plurality of processes spawned by the at least one processor to generate metadata from an image, the processes including processing logic for:

sending the image, over a computer network, to an object detection service, and receiving, from the object detection service, detections metadata generated from the image;

wherein the object detection service comprises at least two object detectors, each of the at least two object detectors being configured to detect objects within the image for a same set of object classes and to output a set of detections;

sending the generated detections metadata, over the computer network, to an uncertainty score calculator, and receiving, from the uncertainty score calculator, an uncertainty score computed from the detections metadata, the uncertainty score being related to a level of uncertainty within the detections metadata, and storing the image, the detections metadata and the uncertainty score in a database that is accessible over the computer network.

20. The computing device of claim 19, further comprising processing logic for the object detection service combining each set of detections output by each of the at least two object detectors in the generated detections metadata to generate a combined set of detections.

21. The computing device of claim 20, further comprising processing logic for the object detection service validating or discarding each detection from the combined set of detections based on pre-existing knowledge of the set of object classes to generate a refined set of detections.

22. The computing device of claim 21, wherein the pre-existing knowledge comprises at least one validation rule for each object class of the set of object classes.

23. The computing device of claim 22, wherein each validation rule comprises information regarding one of dimensions and content of a bounding box of any detection of one object class.

24. The computing device of claim 21, further comprising processing logic for the uncertainty score calculator computing a refinement score that is related to a level of inconsistency between detections from the combined set of detections and pre-existing knowledge of the set of object classes.

25. The computing device of claim 24, wherein the refinement score is related to a ratio of discarded detections obtained by comparing the combined set of detections to the refined set of detections.

26. The computing device of claim 24, wherein the processing logic for generating the uncertainty score comprises processing logic for the uncertainty score calculator to compute a disagreement score that is related to a level of disagreement between the at least two object detectors of the object detection service and to aggregate the disagreement score and the refinement score.

27. The computing device of claim 24 wherein the processing logic for generating the uncertainty score comprises processing logic for the uncertainty score calculator to compute a disagreement score that is related to a level of disagreement between the at least two object detectors of the object detection service and to calculate one of a maximum, minimum and average of the disagreement score and the refinement score.

28. The computing device of claim 19, wherein the generated detections metadata comprises a set of detections from each of the at least two object detectors, a combined set of detections that comprises a combination of the detections sets output by the at least two object detectors, and a refined set of detections that is based on pre-existing knowledge of the set of object classes.

29. The computing device of claim 19, wherein visual features metadata extracted from the image relates to at least one of colors in the image, shapes in the image and textures in the image.

30. The computing device of claim 19, wherein visual features metadata extracted from the image comprises at least one of a color histogram, a histogram of oriented gradients (HOG) and a histogram of co-occurring grayscale values for a given offset.

31. The computing device of claim 19, further comprising processing logic for computing a disagreement score that is related to a level of disagreement between the at least two object detectors of the object detection service.

32. The computing device of claim 31, further comprising processing logic for grouping each detection of the sets of detections output by each object detector of the object detection service into one of an agreement group and a disagreement group based on at least one object class of the set of object classes and a degree to which bounding boxes of the detections overlap.

33. The computing device of claim 32, further comprising processing logic for labelling a group of overlapping detections as an agreement group when each object detector of the object detection service detects an object and all detections belong to a same object class.

34. The computing device of claim 32, further comprising processing logic for labelling a group of overlapping detections as a disagreement group when at least one of:

fewer than all object detectors detect an object, and fewer than all detections belong to a same object class.

35. The computing device of claim 32, wherein the generated disagreement score is related to a ratio of disagreement groups to agreement groups.

36. The computing device of claim 19, further comprising processing logic for using the stored image and uncertainty score in the database and visual features metadata extracted from the image to upgrade the object detection service based upon contents of the database.

* * * * *